United States Patent [19]

Bäbler

[11] Patent Number: 4,801,702

[45] Date of Patent: Jan. 31, 1989

[54] PROCESS FOR THE PREPARATION AND CONDITIONING OR ORGANIC PIGMENTS

[75] Inventor: Fridolin Bäbler, Marly, Switzerland

[73] Assignee: Ciba-Geigy Corporation, Ardsley, N.Y.

[21] Appl. No.: 925,019

[22] Filed: Oct. 30, 1986

[30] Foreign Application Priority Data

Nov. 6, 1985 [CH] Switzerland ............ 4761/85

[51] Int. Cl.$^4$ ............ C09B 19/00; C09B 47/06; C09B 47/067

[52] U.S. Cl. ............ 540/144; 260/367; 534/747; 534/760; 534/887; 540/140; 540/141; 540/142; 540/143; 544/74; 544/75; 544/76; 544/77; 544/339; 546/49; 546/56; 546/57; 546/173; 548/417; 548/453; 548/460; 548/482; 549/56; 549/234

[58] Field of Search ............ 540/140, 141, 142, 143, 540/144; 260/367; 534/747, 760, 887; 544/74, 75, 76, 77, 339; 546/49, 56, 57, 173; 548/417, 453, 460, 482; 549/56, 234

[56] References Cited

U.S. PATENT DOCUMENTS

| | | | |
|---|---|---|---|
| 3,681,403 | 8/1972 | Somlo et al. | 260/396 R |
| 3,758,497 | 9/1973 | Pugin et al. | 548/460 |
| 3,941,768 | 3/1976 | Stocker | 534/579 |

OTHER PUBLICATIONS

Alkohole Hoechst-brochure on Tricyclodecane and Tricyclodecene Alcohols (7-1984).

*Primary Examiner*—Richard L. Raymond
*Attorney, Agent, or Firm*—Luther A. R. Hall

[57] ABSTRACT

A process for the preparation and conditioning of organic pigments, which comprises the use of at least one tricyclodecane alcohol or tricyclodecene alcohol.

15 Claims, No Drawings

PROCESS FOR THE PREPARATION AND CONDITIONING OR ORGANIC PIGMENTS

The present invention relates to a novel process for the preparation and conditioning of organic pigments.

It is known that organic pigments normally have to be conditioned during or after their synthesis, for example by subjecting them to an aftertreatment with an organic solvent, to achieve optimum application properties such as dispersibility, purity, tinting strength and opacity, rheological properties, and fastness to light and weathering. Because the pigments are sparingly soluble, this conditioning is often carried out with selected high-boiling solvents such as α-chloronaphthalene, nitrobenzene, mixtures of diphenyl and diphenyl ether, quinoline, N-methylpyrrolidone or dimethylformamide. However, the use of such solvents is not especially attractive for economic reasons and, in particular, is not without risk from the ecotoxicological standpoint.

It has now been found that, owing to their high boiling point, their high purity and their ideal liquid properties in the temperature range from 25° C. to above 200° C. (e.g. rheology, colourlessness), tricyclodecane alcohols and tricyclodecene alcohols are most suitable solvents for synthesising and conditioning organic pigments without the disadvantages referred to above.

Accordingly, the present invention relates to a process for the preparation and conditioning of organic pigments, which comprises the use of at least one tricyclodecane alcohol or tricyclodecene alcohol.

In this invention, the term "conditioning" shall be understood as meaning recrystallising as well as grinding organic pigments.

The tricyclodecane alcohols which may suitably be used in the process of this invention preferably have the formula

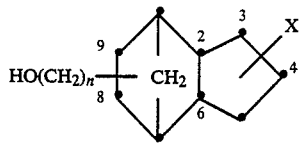

wherein n is 0 or 1 and X is a hydrogen atom or the —CH$_2$OH group.

Examples of such alcohols are: 8(9)-hydroxytricyclo[5.2.1.0$^{2,6}$]decane, 8(9)-hydroxymethyltricyclo[5.2.1.0$^{2,6}$]decane, 3(4),8(9)-bis(hydroxymethyl)-tricyclo[5.2.1.0$^{2,6}$]decane and 3(4)-hydroxymethyltricyclo[5.2.1.0$^{2,6}$]decane.

3(4)-Hydroxymethyltricyclo[5.2.1.0$^{2,6}$]decane is particularly preferred.

A suitable tricyclodecane alcohol is for example 8(9)-hydroxytricyclo[5.2.1.0$^{2,6}$]dec-3-ene.

Organic pigments which can be synthesised and conditioned by the process of this invention are e.g. pigments of the diketopyrrolopyrrole, perylene, quinacridone, phthalocyanine, perinone, quinophthalone, isoindolinone, isoindoline, dioxazine, anthraquinone, thioindigo, methine or azomethine series, as well as azo pigments and the metal salts thereof. Suitable pigments of the azomethine, methine and phthalocyanine series comprise the metal-free as well as the metal complexes thereof.

The process of this invention is particularly suitable for synthesising and conditioning metal phthalocyanines such as copper or cobalt phthalocyanine, and for conditioning azo pigments, especially C.I. Pigment Yellow 13 and C.I. Pigment Orange 34.

The process of the invention is also useful for conditioning diketopyrrolopyrrole, perylene, quinacridone and isoindolinone pigments.

For the synthesis of organic pigments, and in particular for conditioning them by recrystallisation, the eligible tricyclodecane alcohol nd tricyclodecene alcohols may be used singly or in admixture, but preferably also in admixture with other organic solvents such as alcohols, ketones, esters, ethers, aliphatic or aromatic hydrocarbons, pyridine bases or amides. In certain cases, water can be mixed with the pigment in a two-phase mixture, under normal or elevated pressure. The amount of tricyclic alcohol used for the synthesis and recrystallisation depends, inter alia, on the solubility of the pigment to be synthesised or recrystallised in the tricyclic alcohol and on the selected synthesis route for the preparation of the pigment. However, the pigment should preferably not be completely dissolved in the tricyclic alcohol.

Preferably polycyclic pigments such as anthraquinoid, perylene, perinone, quinacridone and dioxazine pigments, and metal complex pigments such as metal phthalocyanines, can be synthesised and, in particular, recrystallised with advantage in the alcohols employed in the process of this invention. The concentration of the pigment in such tricyclic alcohols is not crucial and may be for example from 3 to 30% by weight, preferably from 5 to 15% by weight, based on the tricyclic alcohol employed. However, the pigment suspension should be stirrable during the synthesis or recrystallisation. The suitable synthesis routes are well known to the skilled person.

During their synthesis or recrystallisation in tricyclodecane alcohols or tricyclodecene alcohols, certain polymorphous pigments may undergo a change in crystal modification.

It is preferred to recrystallise the microcrystalline pigments, i.e. the pigments in almost amorphous form which are obtained for example by dry or wet grinding, to a coloristically more advantageous form by a thermal aftertreatment in the tricyclodecane or tricyclodecane alcohol. It is thereby possible to achieve transparent as well as opaque pigment forms having excellent pigment properties such as dispersibility, purity, transparency or opacity, and fastness to migration, light and weathering.

With certain pigment classes such as quinacridones, it is also possible to obtain mixed crystals from suitable pigment mixtures in very finely particulate form by a thermal aftertreatment in the alcohols eligible for use in the process of this invention.

After the synthesis or recrystallisation, the tricyclodecane or tricyclodecene alcohol employed can be removed by methods known per se, preferably by blowing steam into the reaction or recrystallisation mixture, and the pigment is isolated by filtering the suspension so obtained and subsequently drying the filter cake.

Further, it is possible to use the eligible tricyclodecane and tricyclodecene alcohols as grinding assistants in small amounts for grinding organic pigments, for example for dry grinding with or without salt, but especially for wet grinding. For this utility, the tricyclic alcohols can be employed in amounts of preferably 0.05 to 25% by weight, most preferably 0.5 to 10% by weight, based on the pigment to be ground.

For wet grinding, the tricyclic alcohols are conveniently employed in an amount such that they are not dissolved in the pigment suspension. In addition to using pure organic pigments, it is also possible to use pigment mixtures. In this case it is possible to prepare pigment alloys, e.g. those described in European patent specification No. 0042816, or, in suitable cases, pigment solide solutions.

The grinding apparatus may be any suitable device which makes it possible for the pigment and an optional assistant or optional assistants, for example a carrier, to be subjected to strong mechanical forces in the dry state or in a liquid medium. Innumerable devices of this kind are known. They are based, for example, on the principle of a steep velocity gradient produced in liquid medium or of a sudden change in direction or, in particular, on an impact effect or mutual friction of grinding elements such as metal, glass or porcelain balls, plastics granules or sand grains, which are set in motion by rotation of the apparatus or, more effectively still, by vibrators or stirred devices such as glass bead mills.

The grinding temperature is not crucial within technically reasonable limits. Grinding is conveniently effected in the temperature range from 5° to 90° C., preferably from 15° to 60° C.

Even if the pigment suspension to be ground is normally neutral in wet grinding, it may in certain cases be expedient to adjust the pH of the pigment suspension to the acid or alkaline range.

For grinding, further assistants that favourably influence the application properties for the ground pigments, for example texture improving agents, may be used in addition to the tricyclodecane and tricyclodecene alcohol eligible for use in the process of this invention. Such assistants may be added in amounts of 0.05 to 20% by weight, preferably 1 to 10% by weight, based on the pigment or pigment mixture to be ground.

Examples of suitable texture improving agents are fatty acids of at least 12 carbon atoms such as stearic acid or behenic acid, the amides, salts or esters thereof, e.g. magnesium stearate, zinc stearate, aluminium stearate or magnesium behenate, and also quaternary ammonium compounds such as tri($C_1$–$C_4$)alkylbenzylammonium salts, and plasticisers such as epoxidised soybean oil, waxes such as polyethylene wax, resin acids such as abietic acid, colophonium soap, hydrogenated or dimerised colophonium, $C_{12}$–$C_{18}$paraffin disulfonic acids, alkylphenols or alcohols such as stearyl alcohol, also lauryl or stearylamine, as well as 1,2-diols.

Preferred texture improving agents are laurylamine or stearylamine, aliphatic 1,2-diols, stearic acid, the amides, salts or esters thereof, epoxidised soybean oil, waxes or resin acids.

The grinding process of this invention will normally be carried out in the absence of further organic solvents. Minor amounts may, however, be tolerated if they do not impair the process.

In the wet grinding process of this invention, pigment, tricyclodecane alcohol or tricyclodecene alcohol, water and any optional assistants may be charged simultaneously or in succession to the grinding apparatus. The ingredients are ground until the pigment is obtained in the desired transparent tinting strength. Depending on the apparatus employed, batch, speed of rotation, pigment and assistants, the grinding time is from ¼ hour to 72 hours. The requisite grinding time can be readily ascertained from case to case.

Working up can be effected in known manner by filtering the pigment suspension, removing the assistants not contained in the pigment, and drying the filter cake. The tricyclic alcohol employed in the process can be removed by washing the filter cake with an organic solvent such as methanol. Although not necessary, it can be advantageous not to remove the tricyclic alcohol from the pigment or pigment mixture, depending on the pigment and its utility.

In individual cases it is advantageous to grind the pigment until it is obtained in microcrystalline or amorphous form. The resultant pigment can then be converted into a uniformly fine or coarsely particulate form with excellent pigment properties by addition of organic solvents such as esters, alcohols, ketones, glycol ethers or hydrocarbons to the grinding suspension and by heating under normal or elevated pressure. The organic solvent or solvents may conveniently be removed by blowing in steam before filtration of the pigment suspension.

After the grinding procedure, it is possible to prepare pure, high yield pigments having excellent application properties such as rheology and dispersibility.

If the tricyclodecane or tricyclodecene alcohol, or a portion thereof, remains in the pigment or pigment mixture after the synthesis, the recrystallisation or the grinding procedure, then an excellent compatibility of the tricyclic alcohol with the substrate to be coloured is observed, regardless of the amount of alcohol employed. The pigment properties of the coloured substrate, e.g. the fastness to heat, weathering, light and migration, are also not impaired.

Examples of high molecular organic materials which may be coloured with the pigments of this invention are cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

The above high molecular organic compounds may be singly or as mixtures in the form of plastics, melts or of spinning solutions, varnishes, paints or printing inks. Depending on the end use, it is advantageous to use the pigments as toners or in the form of preparations. The pigments obtained by the process of the invention are preferably employed in an amount of 0.01 to 30% by weight, preferably 0.1 to 10% by weight, based on the high molecular organic material to be pigmented.

The pigmenting of the high molecular organic compounds with the pigments of the invention is carried out for example by incorporating such a pigment, optionally in the form of a masterbatch, into the substrates using roll mills, mixing or grinding machines. The pigmented material is then brought into the desired final form by methods which are known per se, for example calendering, moulding, extruding, coating, spinning, casting or by injection moulding. If is often desirable to incorporate plasticisers into the high molecular compounds before processing in order to produce non-brittle mouldings or to diminish their brittleness. Suitable plasticisers are for example esters of phosphoric acid, phthalic acid or sebacic acid. The plasticisers may be incorporated before or after working the pigment into the polymers. To obtain different shades, it is also possible to add fillers or other chromophoric components such as white, coloured or black pigments, in any amount, to the high molecular organic compounds, in addition to the pigments obtained by the process of this invention.

For pigmenting varnishes and printing inks, the high molecular organic materials and the pigments obtained by the process of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The colourations obtained, for example in plastics, filaments, varnishes or paints, have good allround fastness properties such as good dispersibility, high tinting strength, good fastness to overspraying, migration, heat, light and weathering, as well as good gloss.

The invention is illustrated by the following Examples.

EXAMPLE 1

13.0 g of the diketopyrrolopyrrole pigment obtained in Example 1 of EP patent application No. 94 911, 0.7 g of 3-hydroxymethyltricyclo[5.2.1.0$^{2,6}$]decane [sold under the registered trademark TCD alcohol M ® by Hoechst, Germany], 125 g of water and 400 g of glass beads with a diameter of 3.5-4.0 mm are stirred for 8 hours at 320 rpm in a 500 ml glass bead mill with a diameter of 8 cm. The metal blade stirrer employed has a diameter of 5.5 cm and rotates at a speed of 0.92 m/sec. The pigment suspension is separated from the glass beads, which are washed with water. The suspension is then filtered and the filter cake is dried at 70°-80° C. in a vacuum drying cabinet, affording 13.1 g of red diketopyrrolopyrrole pigment having the same structure as the starting pigment and which is pulverised in homogeneous dispersion. It gives strong colorations when incorporated in plastics and varnishes.

EXAMPLE 2

The procedure of Example 1 is repeated, using the diketopyrrolopyrrole pigment obtained in Example 6 of European patent application No. 94911, affording a red pigment with comparably good properties.

EXAMPLE 3

The procedure of Example 2 is repeated, using 0.7 g of 3(4),8(9)-bis(hydroxymethyl)tricyclo[5.2.1.0$^{2,6}$]decane [TCD alcohol DM ®, ex Hoechst) instead of 0.7 g of 8-hydroxymethyltricyclo[5.2.1.0$^{2,6}$]decane [TCD alcohol M ®, ex Hoechst], to give a pigment with comparably good properties.

EXAMPLE 4

8.1 g of coarse crystalline needles of perylenetetracarboxylic dianhydride and 0.9 g of 8-hydroxymethyltricyclo[5.2.1.0$^{2,6}$]decane [TCD alcohol M ®, ex Hoechst] are ground for 3 hours, without external cooling, in 40 g of water and 90 ml of sand (Ottawa sand having a diameter of 2-3 mm) in a 250 ml glass beaker with a diameter of 6 cm, using a nylon disc stirrer of 4.5 cm diameter at a stirring rate of 2000 rpm. The nylon disc stirrer rotates at a speed of c. 4.7 m/sec. The ground pigment suspension is separated from the sand, which is washed with water. The suspension is then filtered and the filter cake is dried at 70°-80° C. in a vacuum drying cabinet and pulverised, affording 8 g of a red perylenetetracarboxylic dianhydride pigment which colours soft PVC rolled sheets in strong shades.

EXAMPLE 5

The procedure of Example 1 is repeated, using the crude form of anthraquinoid indanthrone blue instead of the diketopyrrolopyrrole pigment, to give an indanthrone blue pigment that imparts high colour strength and excellent weathering resistance to alkyd/melamine stoving varnishes.

EXAMPLE 6

14.8 g of crude β-copper phthalocyanine, 0.2 g of 8-hydroxymethyltricyclo[5.2.1.0$^{2,6}$]decane [TCD alcohol M ®, ex Hoechst], 125 g of water and 400 g of glass beads with a diameter of 3.5-4.0 mm are ground for 15 hours at 320 rpm, with water cooling, in a 500 ml glass bead mill of 8 cm diameter. The pigment suspension is separated from the glass beads, which are washed with water. The suspension is then filtered and the filter cake is dried at 70°-80° C. in a vacuum drying cabinet, affording 13.5 g of blue copper phthalocyanine pigment which, when incorporated in powder form into varnishes, gives strong finishes.

EXAMPLE 7

The procedure of Example 6 is repeated, replacing the β-copper phthalocyanine pigment by the dioxazine pigment, C.I. Pigment Violet 37, obtained direct from the synthesis and grinding for 15 instead of 14 hours, to give a very pure violet dioxazine pigment of the same structure which has excellent properties when incorporated in plastics, varnishes and printing inks.

EXAMPLE 8

The procedure of Example 6 is repeated, replacing the β-copper phthalocyanine pigment by 14.2 g of the azo pigment, C.I. Pigment Red 166, obtained direct from the synthesis and 0.8 g of 8-hydroxymethyltricyclo[5.2.1.0$^{2,6}$]decane [TCD alcohol M ®, ex Hoechst] and grinding for 15 instead of 4 hours, to give a high yield azo pigment of the same structure which can be very readily incorporated in plastics and varnishes.

EXAMPLE 9

160 g of crude isoindolinone pigment (C.I. Pigment Yellow 110), 8 g of 8-hydroxymethyltricyclo[5.2.1.0$^{2,6}$]decane [TCD alcohol M ®, ex Hoechst] and 1520 g of water are stirred in a glass beaker for 30 minutes. The pigment suspension is thoroughly ground for 3 hours at 20°-25° C. at a stirring speed of 3000 rpm and a pumping rate of 400 ml/min. in a KDL DYNO-Mill (available from Willy A. Bachofen, Basel), provided with a 600 ml steel mixing chamber filled with 480-510 ml of glass beads of c. 1 mm diameter. The plastic disc stirrer rotates at a speed of 10.2 m/sec. To the resultant pigment suspension, which contains the isoindolinone pigment in microcrystalline form, are added 240 ml of tert-amyl alcohol, and the mixture is heated to 85° C. and stirred at this temperature for 2½ hours. The tert-amyl alcohol is distilled off by blowing in steam. The pigment suspension containing a recrystallised isoindolinone pigment is filtered and the filter cake is washed with water, dried at 80° C. in a vacuum drying cabinet and pulverised, to give a yellow isoindolinone pigment of the same structure as the starting pigment. Electron photomicrographs reveal that the pigment has a uniform particle form with an average particle size of less than 0.2 μm. Despite this finely particulate form, the pigment has good rheological properties when incorporated in varnishes, is readily dispersible, and gives strong colorations.

EXAMPLE 10

42.5 g of crude quinacridone pigment of the γ-form, 0.7 g of Staybelite Resin, 6.8 g of anthraquinoid pigment (C.I. Pigment Red 177), 3.2 g of 8-hydroxymethyltricyclo[5.2.1.0$^{2,6}$]decane [TCD alcohol M ®, ex Hoechst] and 570 g of water are well stirred in a glass beaker for 30 minutes. The pigment suspension is thoroughly ground for 3 hours and 15 minutes at 20°–25° C. at a stirring speed of 3000 rpm and a pumping rate of 400 ml/min. in a KDL DYNO-Mill (ex Willy A. Bachofen, Basel), provided with a 600 ml steel mixing chamber filled with 480–510 ml of glass beads of c. 1 mm diameter. The plastic disc stirrer rotates at a speed of 10.2 m/sec. The pigment suspension is separated from the glass beads, which are washed with 500 ml of water. The suspension is filtered and the filter cake is washed with water, dried at 80° C. in a vacuum drying cabinet and pulverised. When incorporated in varnishes and plastics, the resultant mixture of the above pigments gives very strong bluish-red colorations of excellent fastness properties.

EXAMPLE 11

The procedure of Example 10 is repeated, replacing the 42.5 g of quinacridone pigment by the same amount of N,N'-dimethyl perylenetetracarboximide pigment and using 7.5 g of perylenetetracarboxylic dianhydride pigment instead of C.I. Pigment Red 177. When incorporated in varnishes and plastics, the mixture of pigments of the above chemical structures give very strong red colorations of excellent fastness properties.

EXAMPLE 12

The procedure of Example 4 is repeated, replacing the perylenetetracarboxylic dianhydride by the orange isoindoline pigment obtained in Example 51 of German patent specification No. 2 814 526 and using 3(4),8(9)-bis(hydroxymethyl)tricyclo[5.2.1.0$^{2,6}$]decane [TCD alcohol DM ®, ex Hoechst] instead of TCD alcohol M ®. The product is an isoindoline pigment of the same structure as the starting pigment and can be readily incorporated in varnishes and plastics and has good general pigment properties.

EXAMPLE 13

The procedure of Example 12 is repeated, using 8-hydroxymethyltricyclo[5.2.1.0$^{2,6}$]decane [TCD alcohol M ®, ex Hoechst] instead of TCD alcohol DM ®, to give a pigment with comparably good properties.

EXAMPLE 14

The procedure of Example 4 is repeated, replacing perylenetetracarboxylic dianhydride with the same amount of tetrachlorothioindigo pigment, to give a high yield bordeaux tetrachlorothioindigo pigment with good general fastness properties.

EXAMPLE 15

135 g of Al$_2$(SO$_4$)$_3$.16H$_2$O, 15 g of crude β-quinacridone pigment, and 1.5 ml of 8-hydroxymethyltricyclo[5.2.1.0$^{2,6}$]decane [TCD alcohol M ®, ex Hoechst] are ground for 72 hours in a steel ball mill. The grinding stock is separated from the steel balls and then stirred into 500 ml of water containing 3 ml of concentrated sulfuric acid at 80° C. over 3 hours. The resultant pigment is isolated by filtration, washed free of salt and acid with water, dried at 80° C. in a vacuum drying cabinet and pulverised. The β-quinacridone pigment so obtained has an average particle size of less than 0.1 μm and, when incorporated in varnishes, has excellent properties.

EXAMPLE 16

The procedure of Example 4 is repeated, using 8(9)-hydroxytricyclo[5.2.1.0$^{2,6}$]dec-3-ene [TCD alcohol E ®, ex Hoechst] instead of 0.9 g of 8-hydroxymethyltricyclo[5.2.1.0$^{2,6}$]decane, to give a red pigment of comparably good properties.

EXAMPLE 17

In a 1500 ml glass apparatus equipped with cooler, thermometer, gas inlet pipt and semi-anchor stirrer, 148 g of phthalic anhydride, 240 g of urea and 33.8 g of cobalt(II) chloride (anhydrous) in 400 ml of 8-hydroxymethyltricyclo[5.2.1.0$^{2,6}$]decane [TCD alcohol M ®, ex Hoechst] are heated over 1 hour under nitrogen to 130° C., then over 1 hour to 150° C. and again over 1 hour to 170° C. The resultant suspension is subsequently stirred for 12 hours at 170° C. The reaction mixture is cooled to 80° C. and the pigment suspension is filtered. The filter cake is washed with acetone, then with dilute aqueous sodium hydroxide solution, and suspended in dilute hydrochloric acid. This suspension is stirred, filtered, and the filter cake is washed with water until neutral and free of salt, dried at 80° C. in a vacuum drying cabinet and pulverised, affording 30.5 g of cobalt phthalocyanine.

Microanalysis: theory: 67.26% C; 2.82% H; 19.61% N; 10.31% Co; found: 67.0% C; 2.4% H; 19.6% N; 9.91% Co.

Other metal phthalocyanine pigments such as copper or nickel phthalocyanine can be prepared in similar manner with the corresponding metal salts.

EXAMPLE 18

4.3 g of quinaldine and 8.6 g of tetrachlorophthalic anhydride in 100 ml of 8-hydroxymethyltricyclo[5.2.1.0$^{2,6}$]decane [TCD alcohol M ®, ex Hoechst] are stirred and heated under nitrogen to 190° C. in a 350 ml glass apparatus equipped with cooler, thermometer, gas inlet pipe and semi-anchor stirrer. The mixture is stirred for 4 hours at 190° C. and the resultant yellow suspension is cooled to 40° C., diluted with 150 ml of methanol and filtered. The filter cake is washed with methanol until colourless and the yellow pigment is dried at 80° C in a vacuum drying cabinet, affording 3.9 g of the yellow quinophthalone pigment of formula

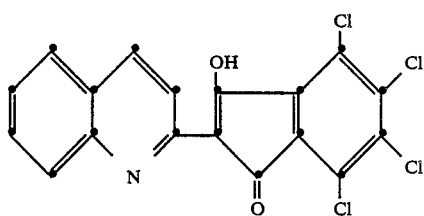

which is incorporated in powder form into printing inks and varnishes and gives strong, yellow colorations of good fastness properties.

Microanalysis: theory: 52.59% C.; 1.72% H; 3.41% N; 34.50% Cl; found: 52.60% C; 1.75% H; 3:40% N; 34.24% Cl.

EXAMPLE 19

5 g of the diketopyrrolopyrrole pigment prepared in acordance with Example 6 of U.S. Pat. No. 4,579,949 and 60 ml of 8-hydroxymethyltricyclo[5.2.1.0$^{2,6}$]decane [TCD alcohol M ®, ex Hoechst] are stirred for 2½ hours at 220° C. The pigment suspension is cooled to 40° C., diluted with 100 ml of methanol and filtered. The filter cake is washed with methanol, dried at 80° C. in a vacuum drying cabinet and pulverised. Compared with the starting pigment, the resultant diketopyrrolopyrrole pigment of the above structure, when incorporated in varnishes and plastics, has a substantially more opaque red hue of improved fastness to light and weathering.

EXAMPLE 20

5 g of isoindoline pigment (C.I. Pigment Yellow 110, as α-crystal modification), 40 g of 1,2-hexanediol and 20 g of 8-hydroxymethyltricyclo[5.2.1.0$^{2,6}$]decane [TCD alcohol M ®, ex Hoechst] are stirred for 4 hours at 220°–230° C. The pigment suspension is cooled, diluted with 100 ml of methanol and filtered. The filter cake is washed with methanol, dried in a vacuum drying cabinet and pulverised, to give an opaque C.I. Pigment Yellow 110 as β-crystal modification, corresponding to the α-modification described in Japanese published patent specification No. 51-088516.

EXAMPLE 21

5 g of finely particulate, commercially available azo pigment (C.I. Pigment Yellow 13), 80 ml of 8-hydroxymethyltricyclo[5.2.1.0$^{2,6}$]decane [TCD alcohol M ®, exc Hoechst] are stirred for 30 minutes at 180° C. The pigment suspension is cooled to 40° C., diluted with 100 ml of methanol and filtered. The filter cake is washed with methanol, dried at 80° C. in a vacuum drying cabinet and pulverised. Compared with the starting pigment, the resulting azo pigment of the above structure, when incorporated in varnishes and plastics, has a substantially more opaque hue of improved fastness to light, weathering and migration.

Repetition of the above procedure, but using a finely particulate, commercially available C.I. Pigment Orange 34 instead of C.I. Pigment Yellow 13 and stirring for 1 hour instead of 30 minutes at 180° C., gives an orange pigment of the same constitution which, compared with the starting pigment, has a substantially more opaque hue of improved fastness to light, weathering and migration.

EXAMPLE 22

A mixture of 130 g of steatite balls having a diameter of 8 mm, 47.5 g of alkyd/melamine stoving varnish consisting of 60 g of Beckosol ® 27-320 (Reichhold Chemie AG), 60% in xylene, 36g of Super-Beckamin ® 13-501 (Reichhold Chemie AG), 50% in a 2:1 mixture of xylene/butanol, 2 g of xylene and 2 g of ethylene glycol monomethyl ether, and 2.5 g of the mixture of pigments obtained in Example 10 are dispersed in a 200 ml glass flask with twist-off cap for 120 hours on a roller gear bed. After separating the glass balls, 2.4 g of the dispersed full shade mixture are mixed with 60 g of titanium dioxide Kronos ® RN 59 (Kronos Titan GmbH) and a further 24.0 g of the alkyd/melamine stoving varnish. The coloured varnish solution is sprayed onto aluminium sheets and subsequently stoved for 30 minutes at 130° C. to give bluish red finishes of excellent fastness properties.

EXAMPLE 23

A mixture of 1.0 g of the isoindolinone pigment obtained in Example 9, 1.0 g of antioxidant (®IRGANOX 1010, ex Ciba-Geigy AG) and 1000 g of high density polyethylene granules (®Vestolen A 60-16, ex Chem. Werke Hüls) is stirred for 15 minutes in a glass flask on a roller gear table. The mixture is then extruded in two passes in a single screw extruder. The granulate so obtained is moulded to plates at 220° C. in an injection moulding machine (Allround Aarburg 200) and then post-formed for 5 minutes at 180° C. The mouldings are coloured in strong yellow shades of excellent fastness properties.

EXAMPLE 24

0.6 g of the mixture of the pigment obtained in Example 1 are mixed with 67 g of polyvinyl chloride, 33 g of dioctyl phthalate, 2 g of dibutyltin dilaurate and 2 g of titanium dioxide and the mixture is processed to a thin sheet on a roll mill for 15 minutes at 160° C. The PVC sheet so obtained is coloured in a very strong red shade which is very fast to migration and light.

EXAMPLE 25

1000 g of polypropylene granules (®DAPLEN PT-55, ex Chemie Linz) and 20 g of a 50% pigment preparation consisting of 10 g of the pigment composition obtained in Example 2 and 10 g of magnesium behenate are thoroughly mixed in a mixing drum. The granules so obtained are melt spun at 260°–285° C. to red filaments of very good lightfastness and textile fibre properties.

What is claimed is:

1. An improved process for the synthesis and concomitant conditioning of an organic pigment selected from the group consisting of the diketopyrrolopyrrole, perylene, quinacridone, phthalocyanine, perinone, quinophthalone, isoindolinone, isoindoline, dioxazine, anthraquinone, thioindigo, methine, azomethine and azo pigments and the metal salts or complexes of the azomethine, methine, azo and phthalocyanine pigments, wherein the improvement comprises
   carrying out the synthesis and concomitant conditioning of said pigment in the presence of a tricyclic alcohol which is 8(9)-hydroxytricyclo[5.2.1.0$^{2,6}$]dec-3-ene or which has the formula

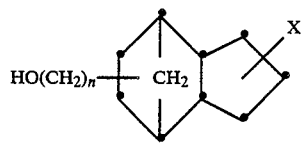

wherein n is 0 or 1, and X is hydrogen or the —CH$_2$OH group; or a mixture of said tricyclic alcohols.

2. A process according to claim 1 wherein the organic pigment is selected from the group consisting of the anthraquinone, perylene, perinone, quinacridone, dioxazine, metal phthalocyanine and azo pigments.

3. A process according to claim 1, wherein the organic pigment is a metal phthalocyanine or an azo pigment.

4. A process according to claim 1, wherein the conditioning takes the form of a grinding procedure in the presence of small amounts of at least one tricyclic alcohol.

5. A process according to claim 4, wherein the amount of tricyclic alcohol is from 0.05 to 25% by weight, based on the pigment to be ground.

6. A process according to claim 1, wherein the tricyclodecane alcohol is 3(4),8(9)-bis(hydroxymethyl)tricyclo[5.2.1.0$^{2,6}$]decane, 8(9)-hydroxy-tricyclo[5.2.1.0$^{2,6}$]decane, 8(9)-hydroxymethyltricyclo[5.2.1.0$^{2,6}$]decane or 3(4)-hydroxymethyltricyclo[5.2.1.0$^{2,6}$]decane.

7. A process according to claim 6, wherein the tricyclodecane alcohol is 8(9)-hydroxymethyltricyclo[5.2.1.0$^{2,6}$]decane.

8. A process for the conditioning of an organic pigment selected from the group consisting of the diketopyrrolopyrrole, perylene, quinacridone, phthalocyanine, perinone, quinophthalone, isoindolinone, isoindoline, dioxazine, anthraquinone, thioindigo, methine, azomethine and azo pigments and the metal salts or complexes of the azomethine, methine, azo and phthalocyanine pigments which comprises
conditioning the preformed crude pigment in the presence of a tricyclic alcohol which is 8(9)-hydroxytricyclo[5.2.1.0$^{2,6}$]dec-3-ene or which has the formula

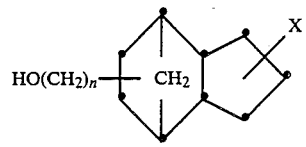

wherein n is 0 to 1, and X is hydrogen or the —CH$_2$OH group; or a mixture of said tricyclic alcohols.

9. A process according to claim 8 wherein the organic pigment is selected from the group consisting of the diketopyrrolopyrrole, perylene, quinacridone and isoindolinone pigments.

10. A process according to claim 8 wherein conditioning takes the form of a grinding procedure in the presence of small amounts of at least one tricyclic alcohol.

11. A process according to claim 10 wherein the amount of tricyclic alcohol is from 0.05 to 25% by weight, based on the pigment to be ground.

12. A process according to claim 10 wherein the grinding procedure is a dry grinding.

13. A process according to claim 10 wherein the grinding procedure is a wet grinding.

14. A process according to claim 8, wherein the tricyclodecane alcohol is 3(4),8(9)-bis(hydroxymethyl)tricyclo[5.2.1.0$^{2,6}$]decane, 8(9)-hydroxytricyclo[5.2.1.0$^{2,6}$]decane or 3(4)-hydroxymethyltricyclo[5.2.1.0$^{2,6}$]decane.

15. A process according to claim 14, wherein the tricyclodecane alcohol is 8(9)-hydroxymethyltricyclo[5.2.1.0$^{2,6}$]decane.

* * * * *